(12) United States Patent
Nakagawa

(10) Patent No.: US 9,378,189 B2
(45) Date of Patent: Jun. 28, 2016

(54) LAYOUT APPARATUS, LAYOUT METHOD, AND COMPUTER-READABLE RECORDING MEDIUM

(71) Applicant: FUJIFILM Corporation, Tokyo (JP)

(72) Inventor: Tomohiro Nakagawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 399 days.

(21) Appl. No.: 13/796,254

(22) Filed: Mar. 12, 2013

(65) Prior Publication Data

US 2013/0262988 A1 Oct. 3, 2013

(30) Foreign Application Priority Data

Mar. 27, 2012 (JP) ................................ 2012-071675
Feb. 19, 2013 (JP) ................................ 2013-030003

(51) Int. Cl.
G06F 17/00 (2006.01)
G06F 17/21 (2006.01)

(52) U.S. Cl.
CPC ............ G06F 17/211 (2013.01); G06F 17/212 (2013.01)

(58) Field of Classification Search
CPC .............................. G06F 17/212; G06F 17/211
USPC ........................................................ 715/243
See application file for complete search history.

(56) References Cited

U.S. PATENT DOCUMENTS

| | | | | |
|---|---|---|---|---|
| 6,690,843 B1 * | 2/2004 | Squilla | ..................... | G06T 11/60 382/306 |
| 7,039,875 B2 * | 5/2006 | Khalfay | ..................... | G06F 8/38 715/744 |
| 7,340,676 B2 * | 3/2008 | Geigel et al. | ................... | 715/716 |
| 7,475,333 B2 * | 1/2009 | Otter | ..................... | G06Q 10/10 715/222 |
| 7,518,640 B2 * | 4/2009 | Nakajima | ................ | G06T 11/60 348/231.2 |
| 7,697,757 B2 * | 4/2010 | Yacoub | ............. | G06F 17/30011 382/176 |
| 8,260,827 B2 * | 9/2012 | Matsushita | .......... | G06F 17/3028 345/656 |
| 8,612,428 B2 * | 12/2013 | Ito | ..................... | G06F 17/30265 382/311 |
| 8,862,986 B2 * | 10/2014 | Atkins et al. | ................... | 715/243 |
| 8,918,713 B2 * | 12/2014 | Sah | ..................... | G06F 17/3089 715/234 |

(Continued)

FOREIGN PATENT DOCUMENTS

| | | |
|---|---|---|
| JP | 2002-288669 | 10/2002 |
| JP | 2004-118352 | 4/2004 |

(Continued)

OTHER PUBLICATIONS

Aslandogan et al., Techniques and Systems for Image and Video Retrieval, IEEE 1999, pp. 56-63.*

(Continued)

*Primary Examiner* — Cong-Lac Huynh
(74) *Attorney, Agent, or Firm* — Young & Thompson

(57) ABSTRACT

A layout apparatus includes: an item storage unit that stores items used in a layout; a first database that stores user's personal layout information and evaluation values with respect to each user; a second database that stores layout information and evaluation values of categories with respect to each category corresponding to attributes of the user; and a layout generation unit that generates a layout of a predetermined item using the predetermined item stored in the item storage unit based on at least either the personal layout information and evaluation values of a predetermined user stored in the first database or the layout information and evaluation values of a category corresponding to attributes of the predetermined user stored in the second database.

24 Claims, 11 Drawing Sheets

(56) References Cited

U.S. PATENT DOCUMENTS

| | | | |
|---|---|---|---|
| 2002/0006235 A1* | 1/2002 | Takahashi | 382/305 |
| 2002/0033848 A1* | 3/2002 | Sciammarella et al. | 345/838 |
| 2002/0122067 A1 | 9/2002 | Geigel et al. | |
| 2003/0053145 A1* | 3/2003 | Nakane | 358/452 |
| 2003/0074373 A1* | 4/2003 | Kaburagi | G06F 17/30265 |
| 2004/0025109 A1* | 2/2004 | Harrington | G06Q 10/04 715/255 |
| 2004/0267633 A1* | 12/2004 | Tanaka | G06Q 30/06 705/26.81 |
| 2005/0111737 A1* | 5/2005 | Das | G06T 11/60 382/190 |
| 2006/0259949 A1* | 11/2006 | Schaefer | G06F 17/30082 726/1 |
| 2007/0126793 A1* | 6/2007 | Yamakado | G06F 17/212 347/43 |
| 2007/0226640 A1* | 9/2007 | Holbrook | G06F 17/30864 715/765 |
| 2008/0050039 A1* | 2/2008 | Jin | 382/284 |
| 2009/0033989 A1* | 2/2009 | Yumoto | G06F 17/30265 358/1.15 |
| 2009/0089660 A1* | 4/2009 | Atkins | G06F 9/4443 715/243 |
| 2009/0313304 A1* | 12/2009 | Goodger | G06F 17/30896 |
| 2010/0166302 A1* | 7/2010 | Yao | 382/164 |
| 2010/0259544 A1* | 10/2010 | Chen et al. | 345/441 |
| 2011/0164283 A1* | 7/2011 | Sadasue | G06F 3/1204 358/1.16 |
| 2011/0213795 A1* | 9/2011 | Lee et al. | 707/769 |
| 2011/0296298 A1* | 12/2011 | Ahuja | G06F 17/30893 715/248 |
| 2012/0117473 A1* | 5/2012 | Han | G11B 27/034 715/723 |
| 2012/0141023 A1* | 6/2012 | Wang et al. | 382/162 |
| 2012/0284595 A1* | 11/2012 | Lyons | G06F 17/211 715/202 |
| 2012/0290925 A1* | 11/2012 | Atkins et al. | 715/243 |
| 2012/0321223 A1* | 12/2012 | Nagasaka et al. | 382/305 |
| 2013/0004073 A1* | 1/2013 | Yamaji et al. | 382/173 |
| 2013/0055055 A1* | 2/2013 | Turcotte et al. | 715/201 |
| 2013/0139055 A1* | 5/2013 | Chen et al. | 715/274 |
| 2013/0250131 A1* | 9/2013 | Yamaji et al. | 348/207.1 |
| 2014/0013217 A1* | 1/2014 | Hashii | G06F 17/212 715/253 |
| 2014/0101152 A1* | 4/2014 | Chen et al. | 707/736 |
| 2015/0062652 A1* | 3/2015 | Kawai et al. | 358/1.18 |
| 2015/0081478 A1* | 3/2015 | Bahrami | G06F 3/0485 705/27.1 |

FOREIGN PATENT DOCUMENTS

| | | |
|---|---|---|
| JP | 2009-245071 | 10/2009 |
| JP | 2010-237986 | 10/2010 |
| JP | 2011-034477 | 2/2011 |
| JP | 2011-160129 | 8/2011 |

OTHER PUBLICATIONS

Chinese Office Action, dated Nov. 2, 2014, in corresponding Chinese Patent Application No. 201310091601.3.

Japanese Official Action—2013-030003—Mar. 11, 2014.

* cited by examiner

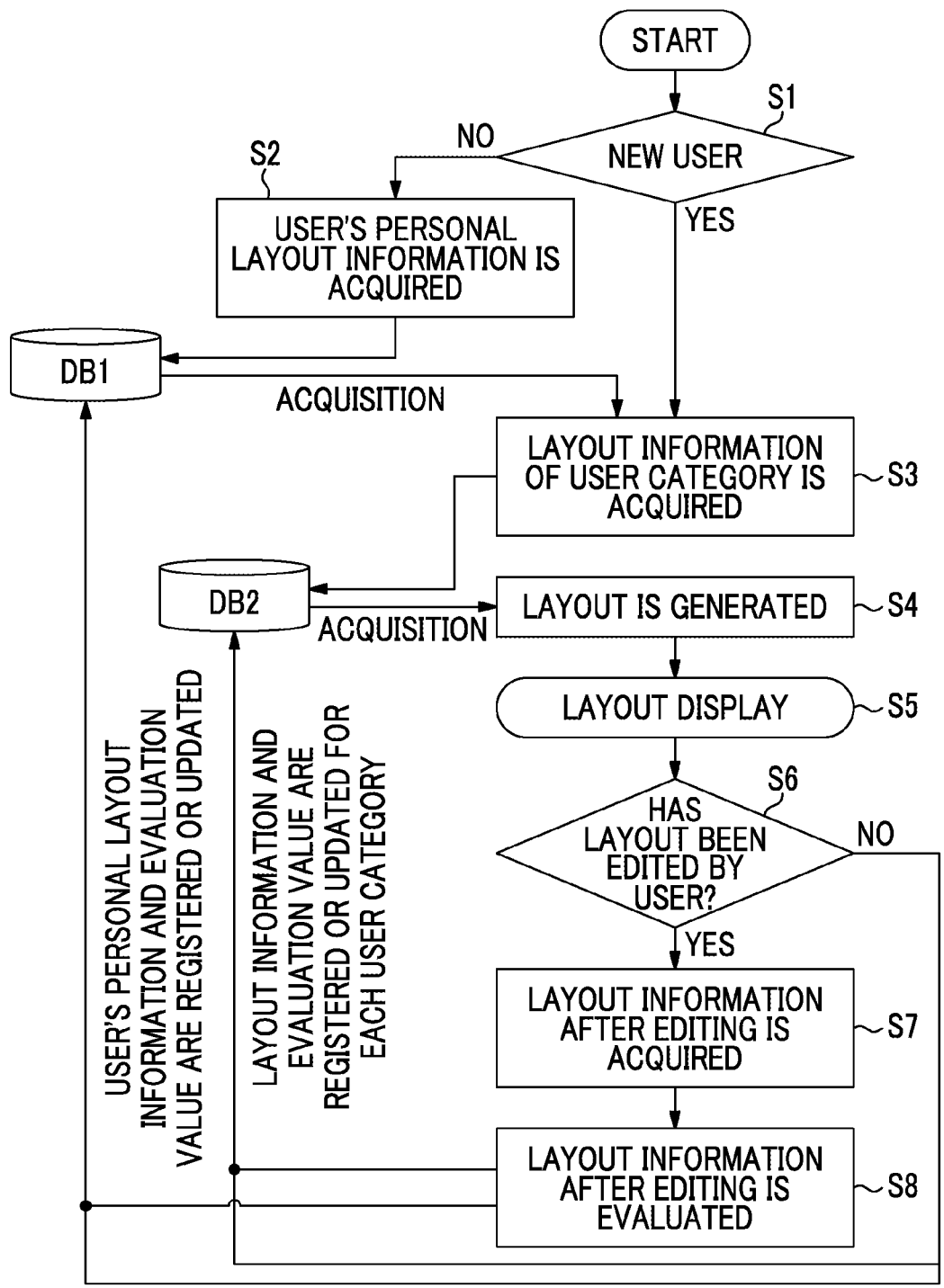

FIG. 7
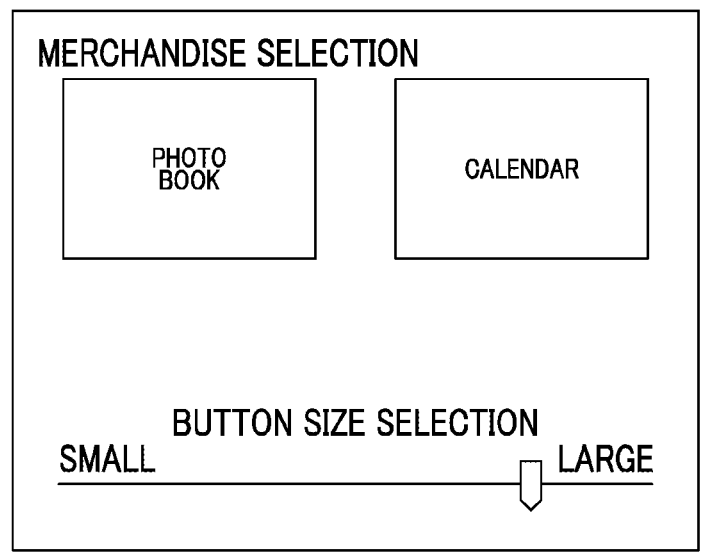
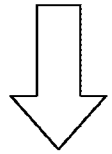
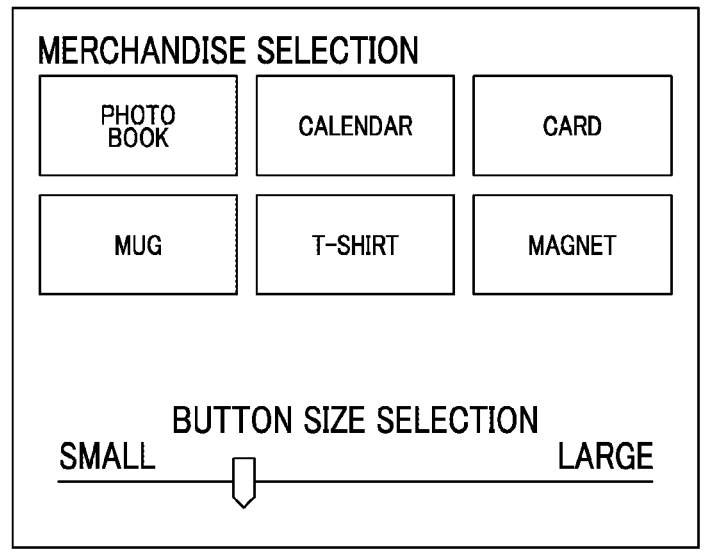

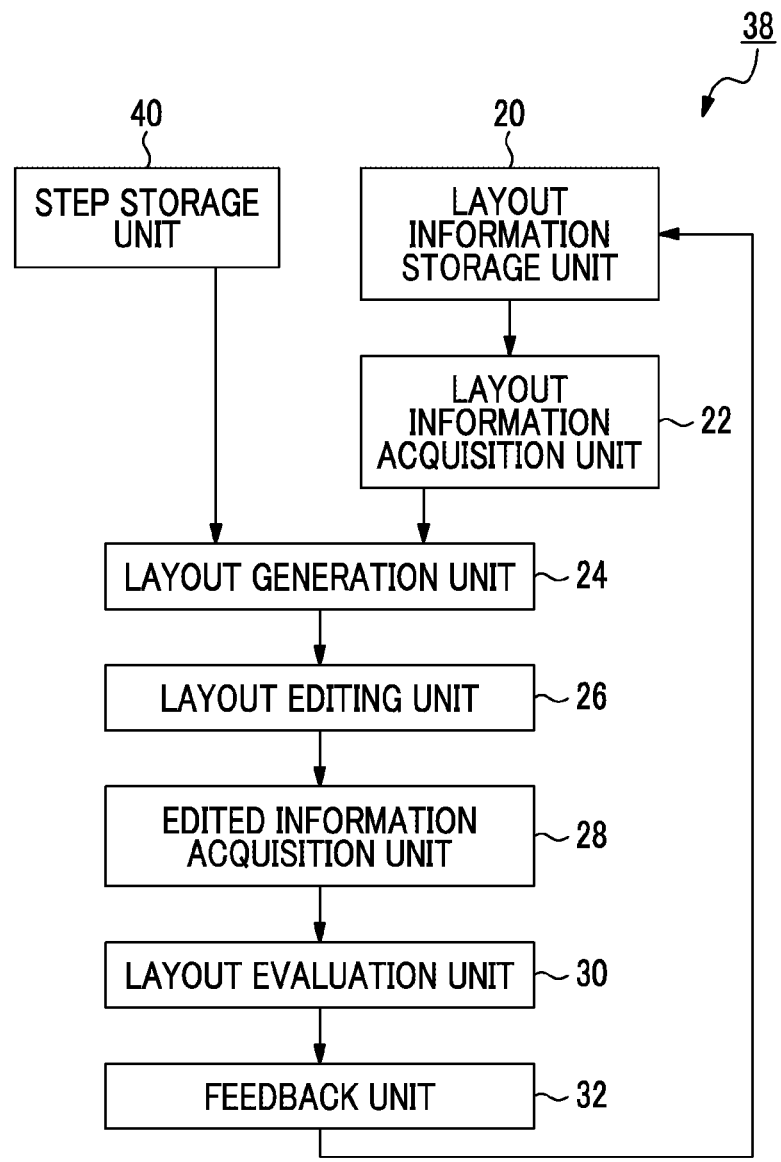

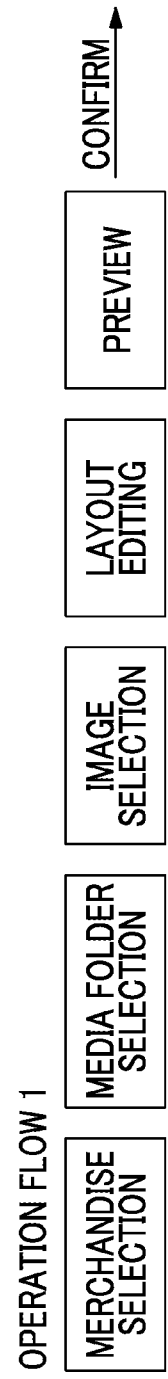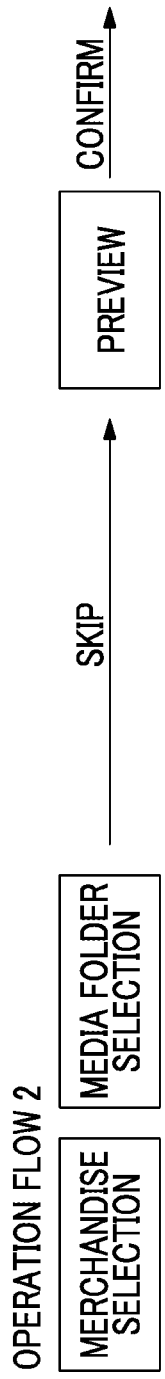

LAYOUT APPARATUS, LAYOUT METHOD, AND COMPUTER-READABLE RECORDING MEDIUM

BACKGROUND OF THE INVENTION

1. Field of the Invention

The present invention relates to a layout apparatus and a layout method to automatically determine the number of images arranged on each page, arrangement positions of images, and the like and generate a layout, for example, when generating a photo book or an electronic photo album and to a computer-readable recording medium.

2. Description of the Related Art

For example, a photo book is a service to generate a photo collection of the layout that a user desires when the user transmits a plurality of images (image data) captured by a digital camera or the like to a service provider through a network, such as the Internet. When generating the photo book, the user can freely determine the number of pages of the photo book, images included in each page, arrangement positions of images on each page, and the like.

On the other hand, it is known to automatically determine images to be included in each page, arrangement positions of images on each page, and the like and thereby generate the layout when generating a photo book or the like and to present the generated layout to the user.

For example, JP2011-34477A discloses means for arranging images in a layout frame based on a arrangement priority of a layout frame, which arrangement priority is determined by performing calculation using a predetermined calculation method based on the relative distance from the reference position of a specified layout, for which the layout frame is specified, to the layout frame, the predetermined calculation method for determining the arrangement priority of the layout frame being specified based on the learning result which is obtained by learning a history in which a first image arranged in the layout frame has been replaced with a second image.

In addition, JP2002-288669A discloses a system that generates an electronic photo album, a design frame, and the like by inputting desired photos to the template of the specified layout for which the layout frame has been determined, and discloses that a desired layout can be completed by sorting the photos using the name of a photographer, recording time, a file name, or the like, generating an initial layout by inputting photos in the sorted order, and rearranging the photos arranged in the initial layout by the user.

SUMMARY OF THE INVENTION

In the case of generating the layout of a photo book or the like using a plurality of images, however, in image organizing for extracting and calculating the feature amount from a large amount of image groups and automatically generating the layout, it is very difficult to match the generated layout with the user's preference. In addition, changing the logic of priority calculation of the layout frame based on the history, in which the user has replaced an image in the fixed layout frame, as disclosed in JP2011-34477A is also insufficient to match the user's preference.

In order to solve the problems in the related art, it is an object of the present invention to provide a layout apparatus, a layout method and a computer-readable recording medium, which can present a layout matching the user's preference more accurately to the user when generating a photo book or the like.

In order to achieve the above-described object, according to an aspect of the present invention, there is provided a layout apparatus including: an item storage unit that stores a plurality of items used in a layout; a first database that stores user's personal layout information and evaluation values with respect to each user; a second database that stores layout information and evaluation values of categories with respect to each category corresponding to attributes of the user; and a layout generation unit that generates a layout of a predetermined item using the predetermined item stored in the item storage unit based on at least either the personal layout information and evaluation values of a predetermined user stored in the first database or the layout information and evaluation values of a category corresponding to attributes of the predetermined user stored in the second database.

In this case, preferably, the item storage unit stores a plurality of images that the user has in association with the user, and the layout generation unit generates a layout of the images of the predetermined user using images of the predetermined user stored in the item storage unit.

In addition, preferably, in the case where the predetermined user is a new user, the layout generation unit generates the layout based on only the layout information and evaluation values of the category corresponding to the attributes of the predetermined user stored in the second database.

In addition, preferably, in the case where the layout generation unit generates a layout of a single page, the layout generation unit generates the layout based on an element with a highest evaluation value among elements of the layout information of the category corresponding to the attributes of the predetermined user stored in the second database.

In addition, preferably, in the case where the layout generation unit generates layouts of a plurality of pages, the layout generation unit determines a ratio of the number of pages corresponding to each element depending on a ratio of evaluation values of respective elements of the layout information of the category corresponding to the attributes of the predetermined user stored in the second database.

In addition, preferably, in the case where the predetermined user is an existing user, the layout generation unit generates the layout based on only the personal layout information and evaluation values of the predetermined user stored in the first database, or generates the layout based on only the layout information and evaluation values of the category corresponding to the attributes of the predetermined user stored in the second database, or generates the layout based on both the personal layout information and evaluation values of the predetermined user stored in the first database and the layout information and evaluation values of the category corresponding to the attributes of the predetermined user stored in the second database.

In addition, preferably, in the case where the layout generation unit generates a layout of a single page, the layout generation unit generates the layout based on the element with the highest evaluation value among the elements of the personal layout information of the predetermined user stored in the first database, or generates the layout based on the element with the highest evaluation value among the elements of the layout information of the category corresponding to the attributes of the predetermined user stored in the second database, or generates the layout based on a value obtained by weighting and adding the element with the highest evaluation value among the elements of the personal layout information of the predetermined user stored in the first database and an element with a highest evaluation value among elements of the layout information of the category corresponding to the attributes of the predetermined user stored in the second database.

In addition, preferably, in the case where the layout generation unit generates layouts of a plurality of pages, the layout generation unit determines the ratio of the number of pages corresponding to each element depending on a ratio of the evaluation values of respective elements of the personal layout information of the predetermined user stored in the first database, or determines a ratio of the number of pages corresponding to each element depending on a ratio of the evaluation values of respective elements of the layout information of the category corresponding to the attributes of the predetermined user stored in the second database, or determines a ratio of the number of pages corresponding to each of the elements depending on a ratio of the values obtained by weighting and adding, with respect to each element, a ratio of the evaluation values of respective elements of the personal layout information of the predetermined user stored in the first database and a ratio of the evaluation values of respective elements of the layout information of the category corresponding to the attributes of the predetermined user stored in the second database.

In addition, preferably, the layout information includes at least one of the number of images and arrangement positions of images.

In addition, preferably, the user attributes include at least one of sex, age, single/married, occupation, and location information of an address or activity base of the user.

Preferably, the layout apparatus further includes: a layout editing unit that edits the layout generated by the layout generation unit in response to an instruction of the predetermined user; an edited information acquisition unit that acquires layout information of the layout edited by the layout editing unit; a layout evaluation unit that evaluates the layout information acquired by the edited information acquisition unit and calculates the evaluation value; and a feedback unit that feeds back the layout information acquired by the edited information acquisition unit and the evaluation value calculated by the layout evaluation unit to the first and second databases.

Preferably, the layout apparatus further includes: a layout editing unit that edits the layout generated by the layout generation unit in response to an instruction of the predetermined user; an edited information acquisition unit that acquires layout information of the layout edited by the layout editing unit; a layout evaluation unit that evaluates the layout information acquired by the edited information acquisition unit and calculates the evaluation value; and a feedback unit that feeds back the layout information acquired by the edited information acquisition unit and the evaluation value calculated by the layout evaluation unit to the first and second databases. It is preferable that the feedback unit weight the evaluation value to be fed back to the first and second databases at a same weighting ratio of weighting as the ratio of weighting used when the layout generation unit generates a layout.

In addition, preferably, the layout information of the edited layout includes at least one of a character font type, a text color, and a template pattern.

In addition, preferably, the layout information of the edited layout further includes at least one of the number of images and an image arrangement method.

In addition, preferably, the image arrangement method includes at least one of image trimming and image zooming.

In addition, preferably, the layout evaluation unit evaluates the layout information of the layout based on relationship between the predetermined user and a recipient of the layout and thereby calculates the evaluation value.

In addition, preferably, the layout editing unit limits an editing function, which is available when the predetermined user edits a layout, according to a number of times of layout editing by the predetermined user.

In addition, preferably, the item storage unit stores a plurality of icons used in a layout of a GUI of an operation screen, and the layout generation unit generates a layout of icons of the GUI using predetermined icons stored in the item storage unit.

In addition, preferably, the item storage unit stores a plurality of steps used in a layout of an operation flow, and the layout generation unit generates a layout of steps of the operation flow using predetermined steps stored in the item storage unit.

In addition, according to another aspect of the present invention, there is provided a layout method including: an item storage step of storing a plurality of items used in a layout in an item storage unit; a first layout information acquisition step of acquiring personal layout information and evaluation values of a predetermined user from a first database that stores user's personal layout information and evaluation values with respect to each user; a second layout information acquisition step of acquiring layout information and evaluation values of a category corresponding to attributes of the predetermined user from a second database that stores layout information and evaluation values of categories with respect to each category corresponding to attributes of the user; and a layout generation step of generating a layout of a predetermined item using the predetermined item stored in the item storage unit based on at least either the personal layout information and evaluation values of the predetermined user acquired in the first layout information acquisition step or the layout information and evaluation values of the category corresponding to the attributes of the predetermined user acquired in the second layout information acquisition step.

Preferably, the layout method further includes: a layout editing step of editing the generated layout in response to an instruction of the predetermined user; an edited information acquisition step of acquiring layout information of the layout edited in the layout editing step; a layout evaluation step of evaluating the layout information acquired in the edited information acquisition step and thereby calculating the evaluation value; and a feedback step of feeding back the layout information acquired in the edited information acquisition step and the evaluation value calculated in the layout evaluation step to the first and second databases.

In addition, according to still another aspect of the present invention, there is provided a non-transitory computer-readable recording medium storing thereon a program for causing a computer to execute each step of the layout method described above.

In the present invention, users are classified into categories according to attributes, and the user's layout editing information is stored and learned as layout information of the category corresponding to the attributes of the user. Therefore, according to the present invention, using not only the user's personal layout information but also the layout information of the category corresponding to the attributes of the user, which has been stored and learned as described above, a layout that accurately reflects the preference of the user can be presented to the user of the same category.

BRIEF DESCRIPTION OF THE DRAWINGS

FIG. 3 is a flow chart showing the operation of the image layout system shown in FIGS. 1 and 2.

FIG. 7 is a conceptual diagram showing how the size of the button in the GUI is changed.

FIG. 9 is a block diagram showing another configuration of the layout apparatus of the present invention.

FIGS. 10A and 10B are conceptual diagrams showing the layout of the operation flow.

DESCRIPTION OF THE PREFERRED EMBODIMENTS

Hereinafter, a layout apparatus, a layout method, and a program of the present invention will be described in detail based on preferred embodiments shown in the accompanying drawings.

Figure 1:
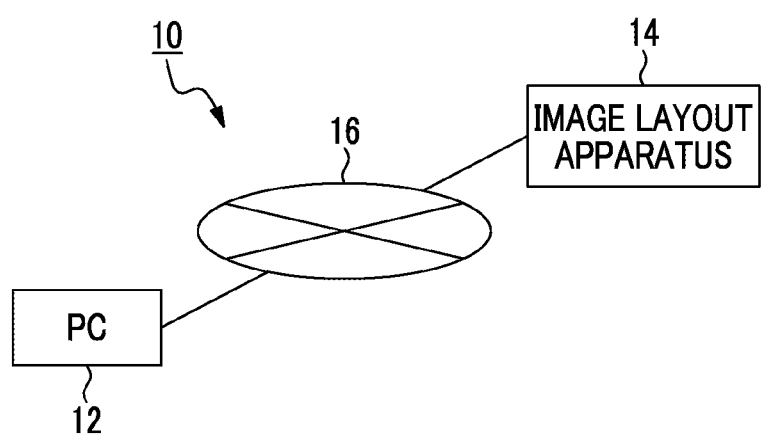
FIG. 1 is a schematic diagram showing the configuration of an image layout system according to an embodiment of the present invention.

FIG. 1 is a conceptual diagram showing the configuration of an image layout system according to an embodiment of the present invention. An image layout system 10 shown in FIG. 1 generates a layout of a photo book, an electronic photo album, or the like using images that a user has (hereinafter, referred to as user images) and that are uploaded through a network 16, such as the Internet. The image layout system 10 is configured to include a PC (personal computer) 12 and an image layout apparatus 14.

The PC 12 is for viewing and editing the layout of a photo book or the like generated by the image layout apparatus 14, and has a communication function of uploading the user image from the PC 12 to the image layout apparatus 14 or downloading the layout data generated by the image layout apparatus 14 from the image layout apparatus 14 to the PC 12 and uploading the layout data after editing from the PC 12 to the image layout apparatus 14.

The PC 12 is a common PC, and includes an input device to input a user instruction or the like, a display device to display an image, a layout, or the like, a storage device to store an image (image data) or the like, a communication device to realize the above-described communication function, a control device to control the overall operation, and the like.

Figure 2:
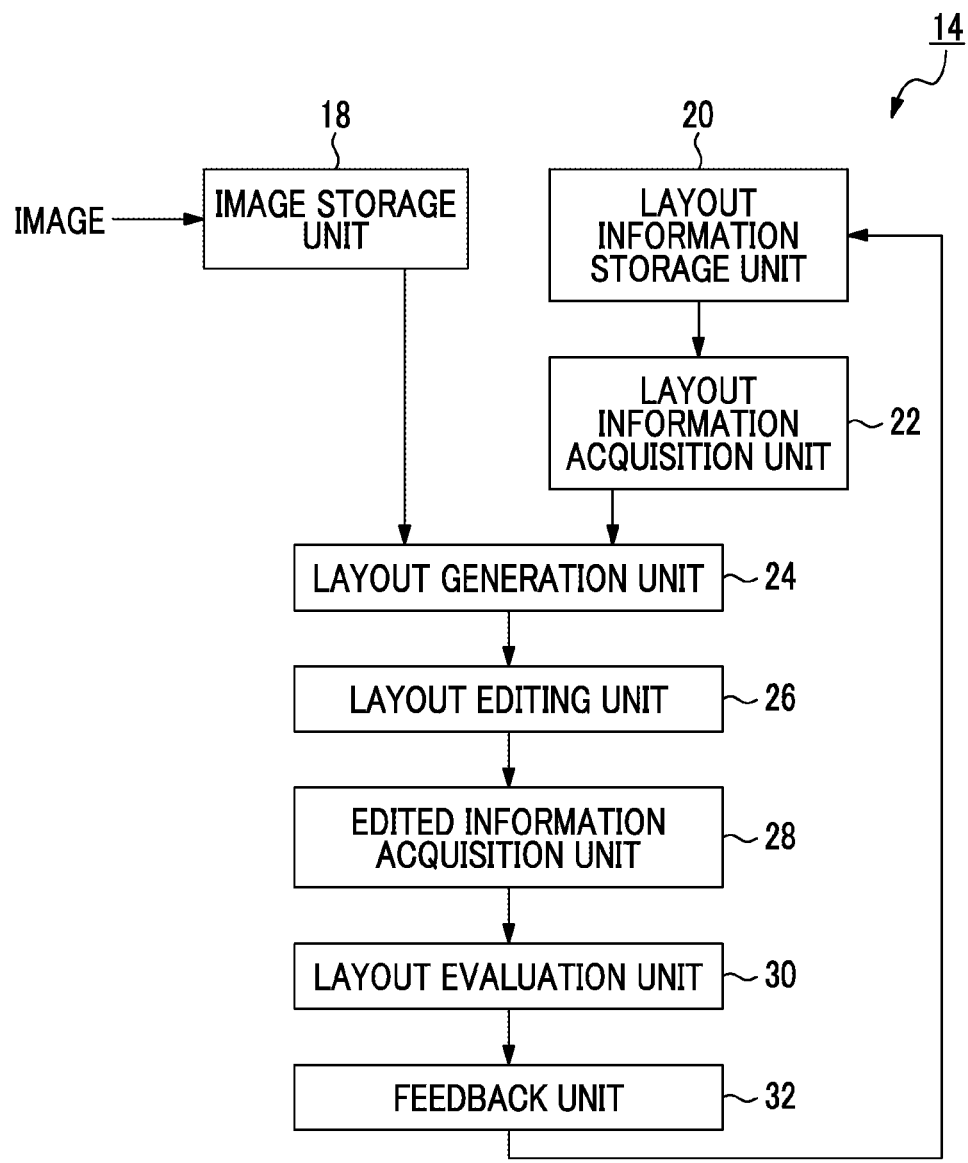
FIG. 2 is a block diagram showing the configuration of an image layout apparatus shown in FIG. 1.
Figure 4A:
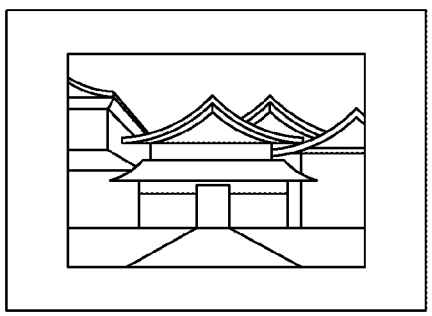
FIGS. 4A to 4E are conceptual diagrams showing layouts in which one to five images are arranged in a page.
Figure 4B:
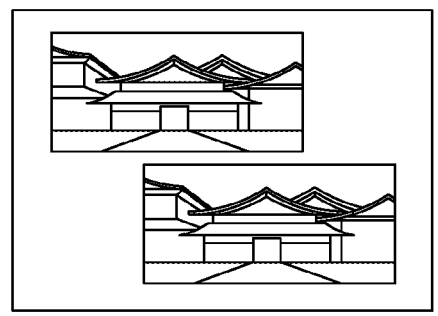
Figure 4C:
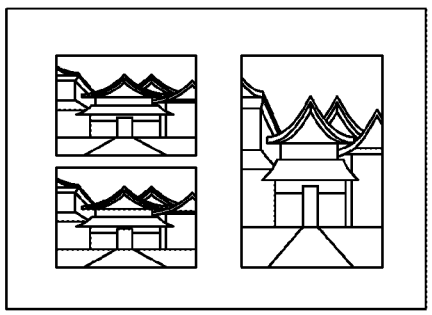
Figure 4D:
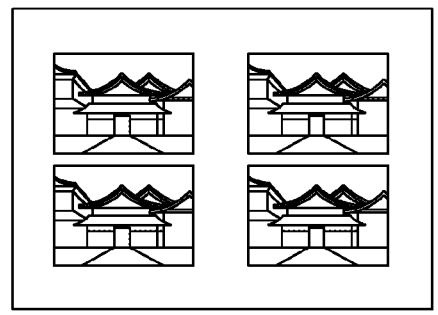
Figure 4E:
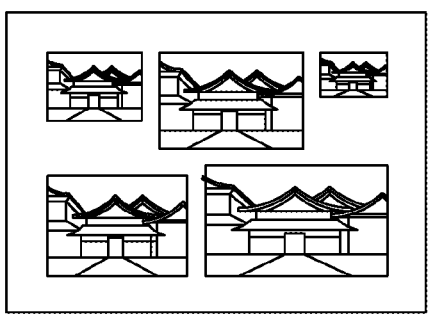

The image layout apparatus (layout apparatus of the present invention) 14 generates a layout of a photo book or the like using a user image uploaded from the PC 12 to the image layout apparatus 14. As shown in FIG. 2, the image layout apparatus 14 includes an image storage unit 18, a layout information storage unit 20, a layout information acquisition unit 22, a layout generation unit 24, a layout editing unit 26, an edited information acquisition unit 28, a layout evaluation unit 30, and a feedback unit 32.

The image storage unit (item storage unit of the present invention) 18 stores a user image (image data) (items of the present invention), which is uploaded from the PC 12 to the image layout apparatus 14 through the network 16, so as to be associated with a user (ID (identification number) or the like) who uploads the image when generating the layout of a photo book or the like.

The layout information storage unit 20 stores layout information used when generating the layout of a photo book or the like. In the present embodiment, the layout information storage unit 20 includes a first database DB1, in which user's personal layout information and evaluation values are stored with respect to each user, and a second database DB2, in which category layout information (hereinafter, also referred to as user category layout information) and the evaluation values are stored with respect to each category corresponding to the attributes of the user (refer to FIG. 3).

The layout information is information used when generating the layout. For example, the layout information includes elements, such as the number of images included in a page and arrangement positions of the images. In the present embodiment, the number of images is used as the layout information. In this case, a layout in which one image is arranged in a page, a layout in which two images are arranged in a page, . . . , and evaluation values of the layouts in which each number of images are arranged are stored in the first and second databases DB1 and DB2.

In addition, the user attributes are information regarding the users themselves for classifying the users who are considered to have the same preference into the same categories. For example, the user attributes include elements, such as sex, age, single/married, occupation, and location information of the address or activity base of the user. For example, in the case where the elements of sex, age, and single/married are used as attributes, layout information and evaluation values are stored in the second database DB2 for each category of sex, age, and single/married.

In addition, for the database in which the layout information is stored, for example, elements, such as the number of images and the arrangement positions of images, may be collectively stored in one database or may be separately stored in a plurality of databases.

The layout information acquisition unit 22 acquires layout information and evaluation values corresponding to a predetermined user from the layout information storage unit 20 when generating the layout of a photo book or the like.

In the case where the user who generates the layout of a photo book or the like is a new user, no layout information and evaluation values are stored in the first database DB1. Therefore, the layout information acquisition unit 22 acquires only the layout information and evaluation values of the user category. On the other hand, in the case where the user is an existing user, the layout information and the evaluation values are stored in the first database DB1. Therefore, the layout information acquisition unit 22 acquires the user's personal layout information and evaluation values, and also acquires the layout information and evaluation values of the user category.

The layout generation unit 22 generates a layout of a photo book or the like using the user images of a predetermined user, which is stored in the image storage unit 18, based on the layout information and evaluation values of the predetermined user acquired by the layout information acquisition unit 22, that is, based on at least either the personal layout information and evaluation values of the predetermined user or the layout information and evaluation values of the category corresponding to the attributes of the predetermined user.

The operation of the layout generation unit 24 in determining a layout varies between a case of generating the layout of only a single page and a case of generating the layouts of a plurality of pages.

First, the case of generating the layout of a single page will be described.

In the case of a new user, the layout generation unit 24 generates a layout based on a layout with the highest evaluation value among the layouts of the layout information of the user category.

On the other hand, in the case of an existing user, the layout generation unit 24:

(A) generates a layout based on an element with the highest evaluation value among the elements of the layout information of the user category;

(B) generates a layout based on an element with the highest evaluation value among the elements of the user's personal layout information; or (C) generates a layout using a value obtained by weighting and adding an element with the highest evaluation value among the elements of the layout information of the user category and an element with the highest evaluation value among the elements of the user's personal layout information.

Next, the case of generating the layouts of a plurality of pages will be described.

In the case of a new user, the layout generation unit 24 determines the ratio of the number of pages corresponding to each element depending on the ratio of the evaluation values of the respective elements of the layout information of the user category.

On the other hand, in the case of an existing user, the layout generation unit 24:

(A) determines the ratio of the number of pages corresponding to each element depending on the ratio of the evaluation values of the respective elements of the layout information of the user category;

(B) determines the ratio of the number of pages corresponding to each element depending on the ratio of the evaluation values of the respective elements of the user's personal layout information; or (C) determines the ratio of the number of pages corresponding to each element depending on the ratio of the values obtained by weighting and adding the ratio of the evaluation values of the respective elements of the layout information of the user category and the ratio of the evaluation values of the respective elements of the user's personal layout information for each element.

That is, in the case of a new user, the layout generation unit 24 generates a layout based on only the layout information and evaluation values of the user category.

In addition, in the case of an existing user, the layout generation unit 24 generates a layout based on only the user's personal layout information and evaluation values, generates a layout based on only the layout information and evaluation values of the user category, or generates a layout based on both the user's personal layout information and evaluation values and the layout information and evaluation values of the user category.

In the case where both the user's personal layout information and the layout information of the user category are weighted and used, the layout generation unit 24 applies a smaller weighting to the layout information of the user category than to the user's personal layout information. In the present embodiment, the weighting ratio between the user's personal layout information and the layout information of the user category is set to 0.8:0.2, however, any other weighting ratio may be arbitrarily set.

The layout editing unit 26 edits the layout generated by the layout generation unit 24 in response to the user's instruction input through the input device of the PC 12.

Here, the layout editing unit 26 may limit editing functions, which can be used when the user edits the layout, according to the user's proficiency in layout editing.

For a user who edits the layout of a photo book or the like first, it is difficult to understand each editing function specifically if all editing functions are available. Therefore, it is preferable to make editing functions, such as resizing of an image or change of the arrangement of images, available depending on the user's proficiency in layout editing, for example, the number of times of layout editing of the user (the number of times of user's experience in layout editing).

The edited information acquisition unit 28 acquires the layout information (layout editing information) of the layout edited by the layout editing unit 26.

The layout editing information includes elements, such as a character font type, a text color, and a template pattern used in a page, for example.

In addition, the layout editing information may include elements, such as the number of images, arrangement positions of images, and an arrangement method of images included in a page, for example. As examples of the image arrangement method, cutting a desired region by trimming an image or enlarging a desired region by zooming in an image may be considered.

The layout evaluation unit 30 calculates the evaluation value by evaluating the layout information (that is, the layout) acquired by the edited information acquisition unit 28.

In addition, the layout evaluation unit 30 evaluates the layout generated by the layout generation unit 24 even in the case where the layout editing has not been performed by the layout editing unit 26.

In the case where the layout editing has not been performed, the user determines that the layout generated by the layout generation unit 24 is appropriate. Therefore, the layout evaluation unit 30 increases the evaluation value of the layout generated by the layout generation unit 24.

The layout evaluation unit 30 may calculate the evaluation value by evaluating the layout based on the relationship (purpose of the layout) between the user and the recipient of the layout (photo book or the like).

In the case where a user gives a photo book or the like to an elder person as a present, arranging a few large images in a page is preferred for the elder person rather than arranging many small images in a page. Therefore, in the case where the recipient is an elder person, a layout in which a few large images are arranged in a page is highly evaluated. In addition, in the case where a user gives a photo book or the like to his or her friend as a present, a layout matching the preference of each friend is highly evaluated.

The feedback unit 32 feeds back the layout information acquired by the edited information acquisition unit 28 and the evaluation value calculated by the layout evaluation unit 30 to the first and second databases DB1 and DB2 of the layout information storage unit 20.

The feedback unit 32 performs relatively small changes in the evaluation value fed back to the second database BD2 compared with changes in the evaluation value fed back to the first database DB1. In the present embodiment, the evaluation values fed back to the first and second database DB1 and DB2 are weighted at the same weighting ratio of 0.8:0.2 as that used when the layout generation unit 24 generates a layout. However, the specific weighting ratio is not limited to this.

Next, the schematic operation of the image layout system 10 according to the image layout method of the present invention will be described with reference to the flow chart shown in FIG. 3.

When generating the layout of a photo book or the like, a user uploads user images from the PC 12 to the image layout apparatus 14 through the network 16.

When the user images are uploaded from the PC 12, the user images uploaded from the PC 12 are stored in the image storage unit 22 of the image layout apparatus 14 so as to be associated with the user who has uploaded the images.

First, the layout information acquisition unit 22 determines whether or not the user is a new user (step S1). In the case where the user is a new user (Yes in step S1), the process proceeds to step S3. On the other hand, in the case where the user is an existing user (No in step S1), the user's personal layout information and evaluation values are acquired from the first database DB1 of the layout information storage unit 20 (step S2), and then the layout information and evaluation values of the user category are acquired from the second database DB2 (step S3).

That is, only the layout information and evaluation values of the user category are acquired in the case of a new user, while the user's personal layout information and evaluation values as well as the layout information and evaluation values of the user category are acquired in case of an existing user.

Then, based on the layout information acquired by the layout information acquisition unit 22, that is, at least either the user's personal layout information and evaluation values or the layout information and evaluation values of the user category, the layout generation unit 24 generates a layout of a photo book or the like using the user images stored in the image storage unit 18 (step S4).

In response to the user's instruction or the like input through the input device of the PC 12, the layout generated by the layout generation unit 24 is downloaded from the image layout apparatus 14 to the PC 12 and is displayed on the display device of the PC 12 (step S5).

The user can see the layout displayed on the display device of the PC 12 and edit the layout according to his or her preference. For example, the number of images in a page, the position of an image in a page, or the size of an image can be changed.

in the case where the layout has been edited by the user, the layout editing unit 26 edits the layout generated by the layout generation unit 24 in response to the user's instruction input through the input device of the PC 12.

In the case where the layout has been edited by the user (Yes in step S6), the edited information acquisition unit 28 acquires the layout information of the layout edited by the layout editing unit 26 (step S7).

Then, the layout evaluation unit 30 evaluates the layout information after editing acquired by the edited information acquisition unit 28 and calculates the evaluation value (step S8). The layout evaluation unit 30 performs evaluation such that the evaluation value of the layout information after editing becomes high.

Then, the feedback unit 32 feeds back the layout information acquired by the edited information acquisition unit 28 and the evaluation value calculated by the layout evaluation unit 30 to the first and second databases DB1 and DB2 of the layout information storage unit 20.

In the present embodiment, evaluation value feedback to the first and second databases DB1 and DB2 is performed as the evaluation value being weighted at the rate of 0.8:0.2 described above.

In the first and second databases DB1, and DB2, existing layout information and evaluation values are updated based on the layout information and the evaluation value that have been fed back.

On the other hand, in the case where the layout is not edited by the user in step S6 (No in step S6), the layout evaluation unit 30 evaluates the existing layout information and calculates the evaluation value since the layout information of the layout generated by the layout generation unit 24 is known. The layout evaluation unit 30 performs evaluation such that the evaluation value of the layout generated by the layout generation unit 24 becomes high. Subsequent operation is the same as in the case where the layout is edited by the user.

As described above, in the image layout system 10, users are classified into categories according to attributes, such as sex or age, and the user's layout editing information is stored and learned as layout information of the user category. Therefore, using not only the user's personal layout information but also the layout information of the user category that has been stored and learned as described above, a layout that accurately reflects the preference of the user can be presented to the user of the same category.

Next, the operation of the layout generation unit 24 will be described by way of a specific example.

In this example, a user A is an existing user, and the attributes are male, 30's, and married. As shown in FIGS. 4A to 4E, the layout generation unit 24 determines the number of images arranged in a page, as layout information, among one to five images.

As shown in Table 1 below, for the personal layout information and evaluation values of the user A, evaluation values in the case where the number of images arranged in a page is 1 to 5 are 30, 10, 20, 35, and 5, respectively, and the total value is 100.

TABLE 1

| 1 image | 2 images | 3 images | 4 images | 5 images | total |
|---------|----------|----------|----------|----------|-------|
| 30      | 10       | 20       | 35       | 5        | 100   |

On the other hand, as shown in Table 2 below, for the layout information and evaluation values of the category to which the user A corresponds, evaluation values in the case where the number of images arranged in a page is one to five are 15, 25, 30, 20, and 10, respectively, and the total value is 100.

TABLE 2

| 1 image | 2 images | 3 images | 4 images | 5 images | total |
|---------|----------|----------|----------|----------|-------|
| 15      | 25       | 30       | 20       | 10       | 100   |

The operation of the layout generation unit 24 for generating a layout based on the personal layout information and evaluation values of the user A shown in Table 1, for example, is as follows.

In the case of generating the layout of a single page, the layout generation unit 24 adopts a layout in which four images are arranged in a page, among the layouts in which one to five images are arranged, since the evaluation value in the case of four images is the highest 35.

On the other hand, in the case of generating the layouts of a plurality of pages, the layout generation unit 24 sets the ratio of the number of pages in which one image is arranged:the number of pages in which two images are arranged:the number of pages in which three images are arranged:the number of pages in which four images are arranged:the number of pages in which five images are arranged to be the ratio of the evaluation values of the layouts in which one to five images are arranged, that is, the ratio of 30:10:20:35:5=6:2:4:7:1.

In addition, the operation of the layout generation unit 24 for generating a layout based on the personal layout information and evaluation values of the user A shown in Table 1 and the layout information and evaluation values of the category to which the user A corresponds shown in Table 2, for example, is as follows.

In the case of generating the layout of a single page, as expressed in the following Expression (1), the layout generation unit 24 determines the number of images as 4 by adding a value obtained by multiplying 4, which is the number of images having the highest evaluation value of 35 in the personal layout information of the user A, by the weighting coefficient of 0.8 and a value obtained by multiplying 3, which is the number of images having the highest evaluation value of 30 in the layout information of the category to which the user A corresponds, by the weighting coefficient of 0.2.

$$4\times 0.8 + 3\times 0.2 = 3.8 \approx 4 \quad (1)$$

On the other hand, in the case of generating the layouts of a plurality of pages, as expressed in the following Expression (2), the layout generation unit 24 sets a ratio obtained by adding, for each element, a value obtained by multiplying each of the ratio 30:10:20:35:5=6:2:4:7:1 of the evaluation values of the layouts, in which one to five images are arranged, of the person layout information of the user A by the weighting coefficient of 0.8 and a value obtained by multiplying each of the ratio 15:25:30:20:10=3:5:6:4:2 of the evaluation values of the layouts, in which one to five images are arranged, of the layout information of the category to which the user A corresponds by the weighting coefficient of 0.2.

$$6*0.8+3*0.2:2*0.8+5*0.2:4*0.8+6*0.2:7*0.8+4*0.2:\\1*0.8+2*0.2=5:3:4:6:1 \quad (2)$$

Next, the operation of the feedback unit 32 will be described by way of a specific example.

A case is considered in which, in the case of generating the layout of a single page, the layout generation unit 24 generates a layout in which four images are arranged in a page as described above and the user changes four images to three images.

In this case, by the feedback unit 32, in the first database DB1, the evaluation value of the layout in which three images are arranged is set to 20+10=30 due to adding 10 to the evaluation value, as shown in Table 3. In addition, the evaluation values of the layouts in which two and four images are arranged are set to 10−2=8 and 35−2=33, respectively, due to subtracting 2 from the evaluation values. In addition, the evaluation values of the layouts in which one and five images are arranged are set to 30−3=27 and 5−3=2, respectively, due to subtracting 3 from the evaluation values.

TABLE 3

| 1 image | 2 images | 3 images | 4 images | 5 images | total |
|---|---|---|---|---|---|
| 30 − 3 | 10 − 2 | 20 + 10 | 35 − 2 | 5 − 3 | 100 |

On the other hand, in the second database DB2, the evaluation value of the layout in which three images are arranged is set to 30+2=32 due to adding 2 to the evaluation value, as shown in Table 4. In addition, the evaluation values of the layouts in which two and four images are arranged are not changed and are maintained at 25 and 20, respectively. In addition, the evaluation values of the layouts in which one and five images are arranged are set to 15−1=14 and 10−1=9, respectively, due to subtracting 1 from the evaluation values.

TABLE 4

| 1 image | 2 images | 3 images | 4 images | 5 images | total |
|---|---|---|---|---|---|
| 15 − 1 | 25 | 30 + 2 | 20 | 10 − 1 | 100 |

In addition, a case is considered in which, in the case of generating the layout of a single page, the layout generation unit 24 generates a layout in which four image are arranged in a page by adding a value obtained by multiplying 4, which is the number of images having the highest evaluation value in the personal layout information of the user A, by the weighting coefficient of 0.8 and a value obtained by multiplying 3, which is the number of images having the highest evaluation value in the layout information of the category to which the user A corresponds, by the weighting coefficient of 0.2 as described above and the user changes four images to three images.

In this case, by the feedback unit 32, in the first database DB1, the evaluation value of the layout in which three images are arranged is set to 20+(10*0.8)=28 due to adding (10*0.8) to the evaluation value using the weighting coefficient used to generate the layout, as shown in Table 5. In addition, the evaluation values of the layouts in which two and four images are arranged are set to 10−(2*0.8)=8.4 and 35−(2*0.8)=33.4, respectively, due to subtracting (2*0.8) from the evaluation values. In addition, the evaluation values of the layouts in which one and five images are arranged are set to 30−(3*0.8)=27.6 and 5−(3*0.8)=2.6, respectively, due to subtracting (3*0.8) from the evaluation values.

TABLE 5

| 1 image | 2 images | 3 images | 4 images | 5 images | total |
|---|---|---|---|---|---|
| 30 − (3 * 0.8) | 10 − (2 * 0.8) | 20 + (10 * 0.8) | 35 − (2 * 0.8) | 5 − (3 * 0.8) | 100 |

On the other hand, in the second database DB2, the evaluation value of the layout in which three images are arranged is set to 30+(2*0.2)=30.4 due to adding (2*0.2) to the evaluation value, as shown in Table 6. In addition, the evaluation values of the layouts in which two and four images are arranged are not changed and are maintained at 25 and 20, respectively. In addition, the evaluation values of the layouts in which one and five images are arranged are set to 15−(1*0.2)=14.8 and 10−(1*0.2)=9.8, respectively, due to subtracting (1*0.2) from the evaluation values.

TABLE 6

| 1 image | 2 images | 3 images | 4 images | 5 images | total |
|---|---|---|---|---|---|
| 15 − (1 * 0.2) | 25 | 30 + (2 * 0.2) | 20 | 10 − (1 * 0.2) | 100 |

Figure 5A:
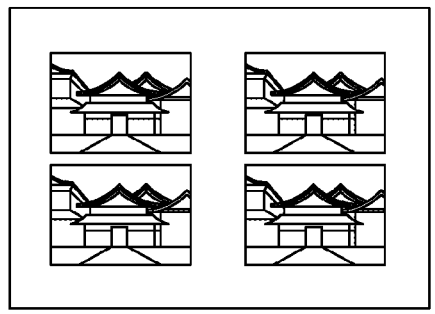
FIGS. 5A to 5C are conceptual diagrams showing the arrangement of images when four images are arranged in a page.
Figure 5B:
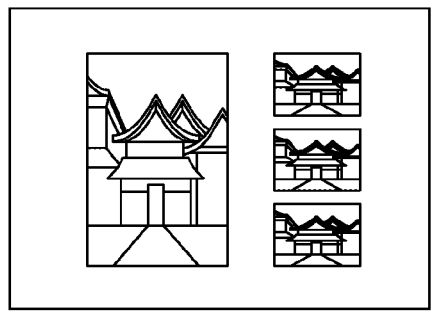
Figure 5C:
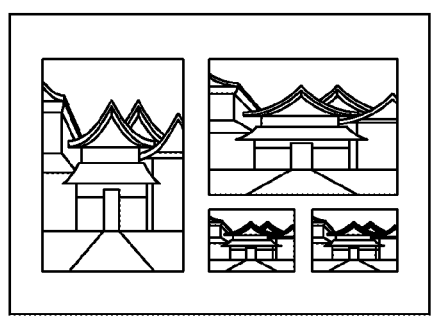

In addition, although the above-described embodiment is for evaluating the number of images, for example, variations in the arrangement positions of certain images with respect to the number of images may also be similarly evaluated. As shown in FIGS. 5A to 5C, when four images are arranged, the arrangement positions of the four images are evaluated as layout information.

In addition, although the case of laying out a plurality of images that the user has, such as a photo book, has been described in the above embodiment, the present invention is not limited to this. For example, the present invention may also be similarly applied to a case of laying out a plurality of icons that form a GUI (graphical user interface) of the operation screen at the time of ordering merchandise (product), such as a photo book, or a case of laying out a plurality of steps of the operation flow at the time of ordering merchandise.

As in the case of the layout of images, such as a photo book, it is thought that layout preferences of the GUI or the operation flow differ depending on the attributes of the user. Therefore, also for the layout of the GUI or the operation flow, a layout of the GUI or the operation flow matching the user's preference more accurately can be presented to the user by feeding back the layout information after editing by the user and the evaluation values and generating the layout of the GUI or the operation flow using the layout information having a high evaluation value for users of the same category. As a result, the usability can be improved.

Figure 6:
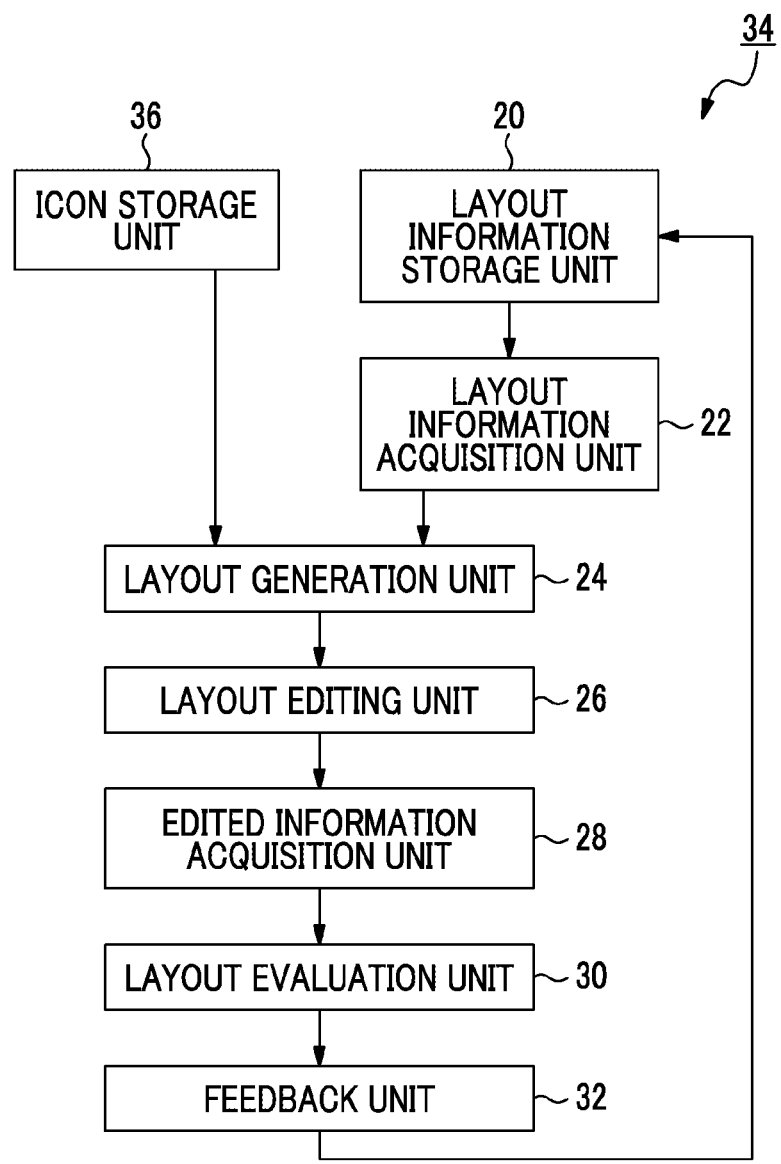
FIG. 6 is a block diagram showing another configuration of the layout apparatus of the present invention.

When applying the present invention to the layout of the GUI, the layout apparatus is an icon layout apparatus that generates a layout of icons in a GUI using a plurality of icons that form the GUI. As shown in FIG. 6, an icon layout apparatus 34 has the same configuration as the image layout apparatus 14 except that the icon layout apparatus 34 includes an icon storage unit 36 instead of the image storage unit 18 provided in the image layout apparatus 14 shown in FIG. 2.

The icon storage unit (item storage unit of the present invention) 36 stores a plurality of icons (items of the present invention) used in the layout of the GUI. Here, examples of the icon used in the layout of the GUI include various buttons and various character fonts, and GUI layout editing includes a work for editing the type, size, arrangement, and style of the button or the character font.

The layout generation unit 24 generates a layout of icons in the GUI using predetermined icons stored in the icon storage unit 36 based on the layout information and evaluation values of a predetermined user acquired by the layout information acquisition unit 22, that is, based on at least either the personal layout information and evaluation values of the predetermined user or the layout information and evaluation values of the category corresponding to the attributes of the predetermined user.

Although detailed explanation regarding the operation of the icon layout apparatus 34 is omitted since the icon layout apparatus 34 operates in the same manner as the image layout apparatus 10, a layout matching the user's preference accurately can also be similarly presented for the layout of the GUI.

For example, as shown in the left portion of FIG. 7, in the case where two buttons are displayed in predetermined sizes on the merchandise selection screen generated by the layout generation unit 24, if a user reduces the button size using the slide bar shown in the lower portion of FIG. 7 so that changes to the display of six buttons are made as shown in the right portion of FIG. 7, the layout evaluation unit 30 performs evaluation such that the evaluation value of the button size after the change becomes high.

Figure 8:
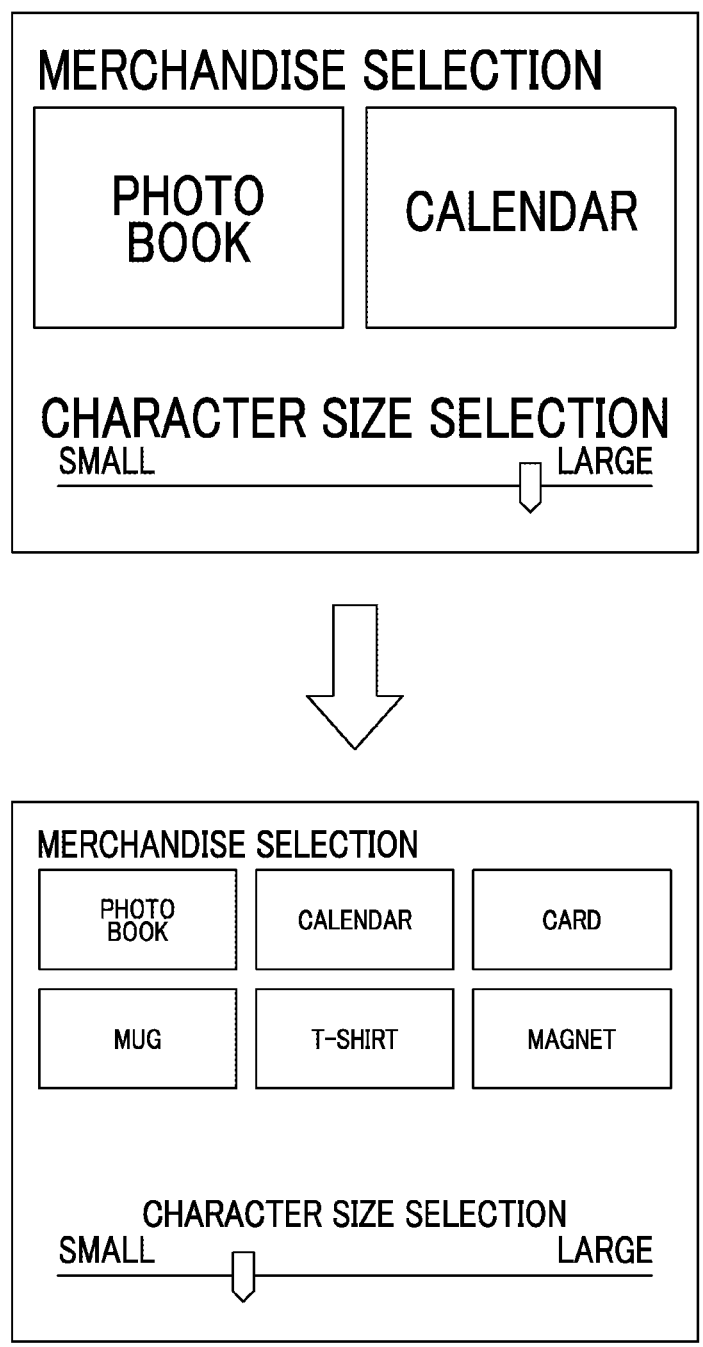
FIG. 8 is a conceptual diagram showing how the size of the character font in the GUI is changed.
Figure 11:
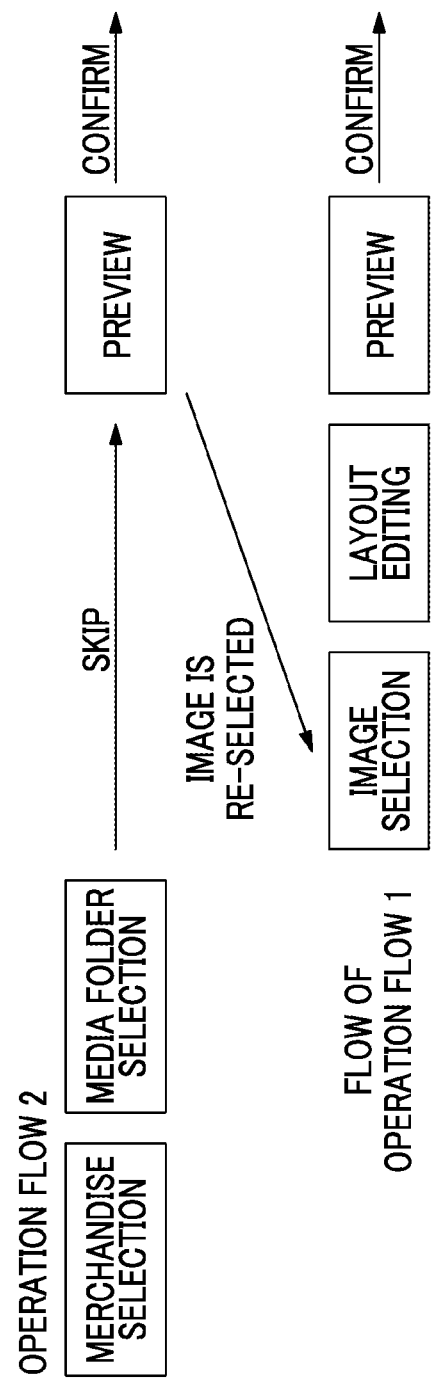
FIG. 11 is a conceptual diagram showing how the operation flow is changed.

In addition, as shown in the left portion of FIG. 8, in the case where a character font is displayed in a predetermined size on the merchandise selection screen generated by the layout generation unit 24, if a user reduces the size of the character font using the slide bar shown in the lower portion of FIG. 8 so that changes are made as shown in the right portion of FIG. 8, the layout evaluation unit 30 performs evaluation such that the evaluation value of the character font size after the change becomes high.

The evaluation value of the layout evaluation unit 30 is fed back to the first and second databases DB1 and DB2 of the layout information storage unit 20 by the feedback unit 32. Accordingly, since the layout generation unit 24 can subsequently generate the layout of the GUI using the evaluation value based on user editing, that is, layout information reflecting the user's preference for the user of the same category, the usability can be improved.

In addition, although the changes of the button size and the character font size have been described by way of examples, the layout of the GUI more reflecting the user's preference can be generated by performing evaluation and feedback similarly for changes of the type, arrangement, style, and the like of the button and the character font.

In addition, when applying the present invention to the layout of the operation flow, the layout apparatus is a step layout apparatus that generates the layout of steps of the operation flow using a plurality of steps of the operation flow. As shown in FIG. 9, a step layout apparatus 38 has the same configuration as the image layout apparatus 14 except that the step layout apparatus 38 includes a step storage unit 40 instead of the image storage unit 18 provided in the image layout apparatus 14 shown in FIG. 2.

The step storage unit (item storage unit of the present invention) 40 stores a plurality of steps (items of the present invention) used in the layout of the operation flow.

Here, steps used in the layout of the operation flow include a merchandise selection step, a media folder selection step, an image selection step, a layout editing step, and a preview step, for example, when ordering merchandise, such as a photo book.

The layout generation unit 24 generates a layout of steps of the operation flow using predetermined steps stored in the step storage unit 40 based on the layout information and evaluation values of a predetermined user acquired by the layout information acquisition unit 22, that is, based on at least either the personal layout information and evaluation values of the predetermined user or the layout information and evaluation values of the category corresponding to the attributes of the predetermined user.

Although detailed explanation regarding the operation of the step layout apparatus 38 is also omitted since the step layout apparatus 38 operates in the same manner as the image layout apparatus 10, a layout matching the user's preference accurately can also be similarly presented for the layout of the operation flow.

For example, the layout generation unit 24 prepares a plurality of operation flows according to the category of the user, such as an operation flow 1 shown in FIG. 10A in which a user can perform fine editing operation at the time of ordering merchandise and an operation flow 2 shown in FIG. 10B in which a user can perform only simple editing operation at the time of ordering merchandise.

Here, the operation flow 1 includes the steps of merchandise selection, media folder selection, image selection, layout editing, and preview in this order. In addition, the operation flow 2 skips the steps of image selection and layout editing of the operation flow 1, and includes only the steps of merchandise selection, media folder selection, and preview in this order.

For example, the layout generation unit 24 presents the operation flow 2 to the user first. On the other hand, in the case where the user sees a preview of the layout and reselects an image used in the layout as in the operation flow 1, the layout evaluation unit 30 determines that the user is a user who performs fine editing operation at the time of ordering merchandise and performs evaluation such that the evaluation value of the operation flow 1 becomes high.

Similarly, the evaluation value of the layout evaluation unit 30 is fed back to the first and second databases DB1 and DB2 of the layout information storage unit 20 by the feedback unit 32, and then the layout generation unit 24 can generate the layout of the operation flow using the evaluation value based on user editing, that is, layout information reflecting the user's preference for the user of the same category. As a result, the usability can be improved.

In addition, the present invention can be similarly applied to, for example, a GUI or an operation flow of an operation screen of services dealing with images, such as image sharing or image search, including album editing and display, as well as the GUI or the operation flow at the time of ordering merchandise order.

The layout method of the present invention can be realized, for example, by the program causing a computer to execute each step of the layout method. This program can be provided in a state recorded in a computer-readable recording medium, for example.

The present invention is basically as described above. While the present invention has been described in detail, the present invention is not limited to the above-described embodiment, and various improvements and modifications may be made without departing from the scope and spirit of the present invention.

What is claimed is:

1. A layout apparatus for generating a layout for users, the layout apparatus comprising:
   an item storage unit that stores a plurality of items used in a layout;
   a first database that stores user's personal layout information and evaluation values with respect to each user who is an existing user;
   a second database that stores user category layout information and evaluation values with respect to each category of a plurality of categories, which correspond to user attributes of the existing user or a new user; and
   a layout generation unit that generates a layout of a predetermined item or items stored in the item storage unit based on whether the user is the existing user or a new user,
      when the user is the existing user, the layout is generated based on one or more of the personal layout information and evaluation values of the existing user stored in the first database and the user category layout information and evaluation values corresponding to attributes of the existing user stored in the second database, and
      when the user is the new user, the layout is generated based on the user category layout information and evaluation values corresponding to attributes of the new user stored in the second database.

2. The layout apparatus according to claim 1, wherein, in a case where the layout generation unit generates a layout of a single page, the layout generation unit generates the layout based on a layout of the number of images with a highest evaluation value among layouts in which each number of images are arranged of the user category layout information corresponding to the attributes of the existing user or the new user stored in the second database.

3. The layout apparatus according to claim 1, wherein, in a case where the layout generation unit generates layouts of a plurality of pages, the layout generation unit determines a ratio of the number of pages corresponding to each layout in which each number of images are arranged depending on a ratio of evaluation values of respective layouts in which each number of images are arranged of the user category layout information corresponding to the attributes of the existing user or the new user stored in the second database.

4. The layout apparatus according to claim 1, wherein, when the user is the existing user, the layout generation unit generates the layout based on only the personal layout information and evaluation values of the existing user stored in the first database, or generates the layout based on only the user category layout information and evaluation values corresponding to the attributes of the existing user stored in the second database, or generates the layout based on both the personal layout information and evaluation values of the existing user stored in the first database and the user category layout information and evaluation values corresponding to the attributes of the existing user stored in the second database.

5. The layout apparatus according to claim 4, wherein, in a case where the layout generation unit generates a layout of a single page, the layout generation unit generates the layout based on a layout of the number of images with a highest evaluation value among layouts in which each number of images are arranged of the user category of the personal layout information of the existing user stored in the first database, or generates the layout based on a layout of the number of images with the highest evaluation value among layouts in which each number of images are arranged from the user category layout information corresponding to the attributes of the existing user stored in the second database, or generates the layout based on a value obtained by weighting and adding the layout with the highest evaluation value among the layouts of the personal layout information of the existing user stored in the first database and the layout with the highest evaluation value among the layouts of the user category layout information corresponding to the attributes of the existing user stored in the second database.

6. The layout apparatus according to claim 4, wherein, in a case where the layout generation unit generates layouts of a plurality of pages, the layout generation unit determines the ratio of the number of pages corresponding to each layout in which each number of images are arranged depending on a ratio of the evaluation values of respective layouts in which each number of images are arranged from the personal layout information stored in the first database, or determines a ratio of the number of pages corresponding to each layout in which each number of images are arranged depending on a ratio of the evaluation values of respective layouts in which each number of images are arranged from the user category layout information corresponding to the attributes of the existing user stored in the second database, or determines a ratio of the number of pages corresponding to each of the layouts in which each number of images are arranged depending on a ratio of the values obtained by weighting and adding, with respect to each layout, a ratio of the evaluation values of respective layouts of the personal layout information of the existing user stored in the first database and a ratio of the evaluation values of respective layouts of the user category layout information corresponding to the attributes of the existing user stored in the second database.

7. The layout apparatus according to claim 5, further comprising:
a layout editing unit that edits the layout generated by the layout generation unit in response to an instruction of the existing user;
an edited information acquisition unit that acquires layout information of the layout edited by the layout editing unit;
a layout evaluation unit that evaluates the layout information acquired by the edited information acquisition unit and calculates the evaluation value; and
a feedback unit that feeds back the layout information acquired by the edited information acquisition unit and the evaluation value calculated by the layout evaluation unit to the first and second databases,
wherein the feedback unit weights the evaluation value to be fed back to the first and second databases at a same ratio of weighting as the ratio of weighting used when the layout generation unit generates a layout.

8. The layout apparatus according to claim 1, wherein the layout information includes at least one of the number of images and arrangement positions of images.

9. The layout apparatus according to claim 1, wherein the user attributes include at least one of sex, age, single/married, occupation, and location information of an address or activity base of the user.

10. The layout apparatus according to claim 1, further comprising:
a layout editing unit that edits the layout generated by the layout generation unit in response to an instruction of the existing user or the new user;
an edited information acquisition unit that acquires layout information of the layout edited by the layout editing unit;
a layout evaluation unit that evaluates the layout information acquired by the edited information acquisition unit and calculates the evaluation value; and
a feedback unit that feeds back the layout information acquired by the edited information acquisition unit and the evaluation value calculated by the layout evaluation unit to the first and second databases.

11. The layout apparatus according to claim 10, wherein the layout information of the edited layout includes at least one of a character font type, a text color, and a template pattern.

12. The layout apparatus according to claim 11, wherein the layout information of the edited layout further includes at least one of the number of images and an image arrangement method.

13. The layout apparatus according to claim 12, wherein the image arrangement method includes at least one of image trimming and image zooming.

14. The layout apparatus according to claim 10,
wherein the layout evaluation unit evaluates the layout information of the layout based on a relationship between the existing user or the new user and a recipient of the layout and thereby calculates the evaluation value.

15. The layout apparatus according to claim 10,
wherein the layout editing unit limits an editing function, which is available when the existing user or the new user edits a layout, according to a number of times of layout editing by the existing user or the new user.

16. The layout apparatus according to claim 1, wherein the item storage unit stores a plurality of icons used in a layout of a GUI of an operation screen, and the layout generation unit generates a layout of icons of the GUI using predetermined icons stored in the item storage unit.

17. The layout apparatus according to claim 1, wherein the item storage unit stores a plurality of steps used in a layout of an operation flow, and the layout generation unit generates a layout of steps of the operation flow using predetermined steps stored in the item storage unit.

18. The layout apparatus according to claim 1, wherein the item storage unit stores a plurality of images that the existing user or the new user has in association with the existing user or the new user, and
the layout generation unit generates a layout of images of the existing user or the new user using the images of the new user or the existing user stored in the item storage unit.

19. The layout apparatus according to claim 18, wherein, when the user is the new user, the layout generation unit generates the layout based on only the user category layout information and evaluation values corresponding to the attributes of the new user stored in the second database.

20. A layout method comprising:
an item storage step of storing, by an item storage unit, a plurality of items used in a layout;
a first layout information acquisition step of acquiring, by a layout information acquisition unit, personal layout information and evaluation values of an existing user from a first database that stores user's personal layout information and evaluation values with respect to the existing user;
a second layout information acquisition step of acquiring, by the layout information acquisition unit, user category layout information and evaluation values of a category of a plurality of categories corresponding to user attributes of the existing user or a new user from a second database that stores user category layout information and evaluation values with respect to each category corresponding to user attributes of the existing user or the new user; and
a layout generation step of generating, by a layout generation unit, a layout of a predetermined item or items stored in the item storage unit based on whether the user is the existing user or a new user,
when the user is the existing user, the layout is generated based on one or more of the personal layout information and evaluation values of the existing user acquired in the first layout information acquisition step and the user category layout information and evaluation values corresponding to the attributes of the existing user acquired in the second layout information acquisition step, and
when the user is the new user, the layout is generated based on the user category layout information and evaluation values corresponding to attributes of the new user acquired in the second layout information acquisition step.

21. The layout method according to claim 20, further comprising:
a layout editing step of editing, by a layout editing unit, the generated layout in response to an instruction of the existing user or the new user;
an edited information acquisition step of acquiring, by an edited information acquisition unit, layout information of the layout edited in the layout editing step;
a layout evaluation step of evaluating, by a layout evaluation unit, the layout information acquired in the edited information acquisition step and thereby calculating the evaluation value; and
a feedback step of feeding, by a feedback unit, back the layout information acquired in the edited information acquisition step and the evaluation value calculated in the layout evaluation step to the first and second databases.

22. A non-transitory computer-readable recording medium storing thereon a program for causing a computer to execute each step of the layout method according to claim 20.

23. The layout method according to claim 20, wherein the item storage unit stores a plurality of images that the existing user or the new user has in association with the existing user or the new user, and the layout generation unit generates a layout of images of the existing user or the new user using the images of the existing user or the new user stored in the item storage unit.

24. The layout method according to claim 23, wherein, when the user is the new user, the layout generation unit generates the layout based on only the user category layout information and evaluation values corresponding to the attributes of the new user stored in the second database.

\* \* \* \* \*